United States Patent
Bowman et al.

(10) Patent No.: US 7,324,577 B2
(45) Date of Patent: Jan. 29, 2008

(54) END-FACE SEAL FOR MALE-FEMALE ELECTRODE JOINTS

(75) Inventors: Brian Bowman, Westlake, OH (US); Terrence Patrick Wells, Strongsville, OH (US); Thomas William Weber, Cleveland, OH (US); James J. Pavlisin, Cleveland, OH (US)

(73) Assignee: GrafTech International Holdings Inc., Parma, OH (US)

( * ) Notice: Subject to any disclaimer, the term of this patent is extended or adjusted under 35 U.S.C. 154(b) by 65 days.

(21) Appl. No.: 11/358,160

(22) Filed: Feb. 21, 2006

(65) Prior Publication Data

US 2007/0127540 A1    Jun. 7, 2007

Related U.S. Application Data

(63) Continuation-in-part of application No. 10/760,947, filed on Jan. 20, 2004, now abandoned.

(51) Int. Cl.
*H05B 7/14* (2006.01)

(52) U.S. Cl. .......................................... 373/95; 373/92

(58) Field of Classification Search ................. 373/92, 373/91, 95, 110, 88, 93, 94; 403/296; 277/610; 156/91; 439/87, 427, 429; 423/448
See application file for complete search history.

(56) References Cited

U.S. PATENT DOCUMENTS

| | | | |
|---|---|---|---|
| 2,810,117 A | 10/1957 | Abbott ........................ 339/268 |
| 2,836,805 A | 5/1958 | Stroup ........................ 339/263 |
| 3,140,967 A | 7/1964 | Kaufmann et al. ........... 156/91 |
| 3,187,089 A | 6/1965 | Crosby et al. |
| 3,404,061 A | 10/1968 | Shane ......................... 161/125 |
| 3,540,764 A | 11/1970 | Paus et al. .................. 287/127 |
| 3,612,586 A | 10/1971 | Stieber et al. ............... 287/127 |
| 3,814,828 A | 6/1974 | Gazda ............................ 13/18 |
| 4,594,722 A * | 6/1986 | Boder .......................... 373/91 |
| 4,639,928 A | 1/1987 | Conradty et al. |
| 4,895,713 A | 1/1990 | Greinke et al. ............. 423/448 |
| 5,645,284 A | 7/1997 | Fitton ......................... 277/204 |
| 5,902,762 A | 5/1999 | Mercuri et al. ............... 501/99 |
| 2002/0142164 A1 | 10/2002 | Pavlisin et al. |
| 2005/0175061 A1 | 8/2005 | Frastaci et al. |
| 2005/0249260 A1 | 11/2005 | Smith |

FOREIGN PATENT DOCUMENTS

DE    3506023 A1    8/1986

* cited by examiner

*Primary Examiner*—Quang Van
(74) *Attorney, Agent, or Firm*—James R. Cartiglia; Waddey & Patterson P.C.

(57) ABSTRACT

A male-female electrode joint is presented, the joint including two joined graphite electrodes having blocked threads and having a seal interposed between the electrodes, the seal composed of a material having an oxidation rate equal to or less than that of the electrodes.

13 Claims, 3 Drawing Sheets

END-FACE SEAL FOR MALE-FEMALE ELECTRODE JOINTS

RELATED APPLICATION

This application is a continuation-in-part of copending and commonly assigned U.S. patent application having Ser. No. 10/760,947 entitled "End-Face Seal for Graphite Electrodes," filed in the names of Bowman, Wells, Weber, and Pavlisin on Jan. 20, 2004, now abandoned the disclosure of which is incorporated herein by reference.

BACKGROUND OF THE INVENTION

1. Technical Field

The present invention relates to an end-face seal for use in graphite electrode joints formed from male-female graphite electrodess, and a process for preparing the inventive end-face seal. More particularly, the invention concerns a seal, advantageously formed of particles of expanded graphite, used at the end faces of joined graphite electrodes to protect the surfaces of an electrode joint from oxidation.

2. Background Art

Graphite electrodes are used in the steel industry to melt the metals and other ingredients used to form steel in electrothermal furnaces. The heat needed to melt metals is generated by passing current through a plurality of electrodes, usually three, and forming an arc between the electrodes and the metal. Electrical currents in excess of 100,000 amperes are often used. The resulting high temperature melts the metals and other ingredients. Generally, the electrodes used in steel furnaces each consist of electrode columns, that is, a series of individual electrodes joined to form a single column. In this way, as electrodes are depleted during the thermal process, replacement electrodes can be joined to the column to maintain the length of the column extending into the furnace.

Conventionally, electrodes are joined into columns via a pin (sometimes referred to as a nipple) that functions to join the ends of adjoining electrodes. Typically, the pin takes the form of opposed male threaded sections, with at least one end of the electrodes comprising female threaded sections capable of mating with the male threaded section of the pin. Thus, when each of the opposing male threaded sections of a pin are threaded into female threaded sections in the ends of two electrodes, those electrodes become joined into an electrode column. Commonly, the joined ends of the adjoining electrodes, and the pin therebetween, are referred to in the art as a joint.

Alternatively, it has been found that electrodes can be formed with a male threaded protrusion or stub machined into one end and a female threaded socket machined into the other end, such that the electrodes can be joined by threading the male stub of one electrode into the female socket of a second electrode, and thus form an electrode column having sufficient strength to survive under the conditions existing in an electric arc furnace. The joined ends of two adjoining electrodes in such an embodiment is also referred to in the art as a joint.

Given the extreme thermal stress that the electrode and the joint (and indeed the electrode column as a whole) undergoes, mechanical/thermal factors such as strength, thermal expansion, and crack resistance must be carefully balanced to avoid damage or destruction of the electrode column or individual electrodes. For instance, longitudinal (i.e., along the length of the electrode/electrode column) thermal expansion of the electrodes, especially at a rate different than that of the pin, can force the joint apart, reducing effectiveness of the electrode column in conducting the electrical current. A certain amount of transverse (i.e., across the diameter of the electrode/electrode column) thermal expansion of the electrode in excess of that of the pin may be desirable to form a firm connection between pin and electrode; however, if the transverse thermal expansion of the electrode greatly exceeds that of the pin, damage to the electrode or separation of the joint may result. Again, this can result in reduced effectiveness of the electrode column, or even destruction of the column if the damage is so severe that the electrode column fails at the joint section.

One preferred way of forming male-female graphite electrodes and a male-female electrode joint is described in patent application Pub. No. US 2005/0249260, for "Male-Female Electrode Joint," filed in the name of Smith on Apr. 23, 2004, the disclosure of which is incorporated herein by reference In the production of a male-female electrode joint, so-called "blocked" threads are often employed. In blocked threads, both thread flanks from one of the elements (such as the male tang) is in contact with both thread flanks from the other element (such as the female socket), as illustrated in FIG. 8A. Contrariwise, in "non-blocked" or "unblocked" threads, only one thread flank from each element contacts the threads of the other element, as illustrated in FIG. 8B.

When male-female electrodes having blocked threads are employed, however, the a gap exists between the two adjoining electrodes in a joint. Such a gap formed in a joint can lead or oxidation of the threads of the male tang and other joint surfaces, resulting in loss of material and what is referred to as "necking." Necking occurs when sufficient material is oxidized away from the joint surfaces to narrow and thus weaken the joint between the two end faces. Necking reduces effectiveness of the electrode column in conducting the electrical current, reduces the mechanical strength of the joint, and can ultimately lead to failure of the joint and catastrophic loss of the electrode column. For instance, when necking occurs to a significant degree, the vibrations normally experienced by an electrode column in use in the furnace can lead to cracks and ruptures in the male tang, or the female electrode, and separation of the joint and loss of the electrode column below the affected joint.

In U.S. Pat. No. 3,540,764, Paus and Revilock suggest the use of an expanded graphite spacer disposed between the end faces of adjacent electrodes in order to increase electrical conductivity and thermal stress resistance of the joint. The nature of the Paus and Revilock spacer and its placement, however, is such that a gap is created in the joint where it may not have otherwise been, thereby contributing to joint looseness and potential for failure.

What is desired, therefore, is a seal that can be used to reduce oxidation at the surfaces portions of graphite electrode joints, without a significant reduction in electrode performance. It is also highly desirable to achieve these property benefits without using high quantities of expensive materials.

SUMMARY OF THE INVENTION

It is an aspect of the present invention to provide a seal for the end faces of graphite electrodes having blocked threads.

It is another aspect of the present invention to provide a seal for the end faces of graphite electrodes which reduces or eliminates the oxidation of the surfaces of electrode joints.

It is yet another aspect of the present invention to provide a seal for the end faces of male-female graphite electrodes which produces electrode column joints having improved strength and stability.

Still another aspect of the present invention is a graphite electrode joint, having improved resistance to oxidation as compared to art-conventional graphite electrode joints.

These aspects and others that will become apparent to the artisan upon review of the following description can be accomplished by providing an electrode joint comprising two joined graphite electrodes having blocked threads and having a seal interposed between the electrodes, the seal comprising a compressible material, especially compressed particles of exfoliated graphite. The seal material preferably comprises material having an oxidation rate equivalent to or less than that of the electrodes. In a preferred embodiment, the electrical conductivity of the seal is greater in the direction extending between the electrodes than it is in the direction orthogonal thereto. In order to accomplish this, the seal should advantageously comprise a spiral wound sheet of compressed particles of exfoliated graphite.

The two joined electrodes forming the joint preferably comprise an electrode having a male threaded tang and an electrode having a female threaded socket, wherein the male threaded tang engages the female threaded socket with blocked threads to form the joint.

Preferably, to form the inventive seal, a sheet of compressed particles of exfoliated graphite is provided and then wound (for instance around a bolster having a diameter equal to the inner opening of the seal) to form a spiral wound seal suitable for use between the electrodes in an electrode joint. The seal should have an outer diameter generally equal to the outer diameter of the electrode joint and an inner opening, and can but does not necessarily have an adhesive interposed between the layers of the spiral wound sheet of compressed particles of exfoliated graphite.

In addition to being formed of a compressible material such as spiral wound sheets of compressed particles of exfoliated graphite, the inventive seal can be shaped so as to increase its compressibility, such as by molding. For example, the sheet can be molded so as to assume a concave shape when viewed along the plane of the end faces of one or both of the electrodes between which the seal is situated. The space between the tapered "arms" at either end of the concavity provides even greater potential for compressibility. Moreover, a ramming paste, cement or other putty-like material can be positioned in the concave space to further inhibit oxidation. Another way compressibility of the spiral wound exfoliated graphite sheets can be increased is by forming a "rippled" or "corrugated" surface of the seal, also by molding. The concave or corrugated surfaces of the seal are, of course, one or both of the surfaces which abut the respective electrode end faces.

It is to be understood that both the foregoing general description and the following detailed description provide embodiments of the invention and are intended to provide an overview or framework of understanding and nature and character of the invention as it is claimed. The accompanying drawings are included to provide a further understanding of the invention and are incorporated in and constitute a part of the specification. The drawings illustrate various embodiments of the invention and together with the description serve to describe the principles and operations of the invention.

DETAILED DESCRIPTION OF THE PREFERRED EMBODIMENT

Figure 1:
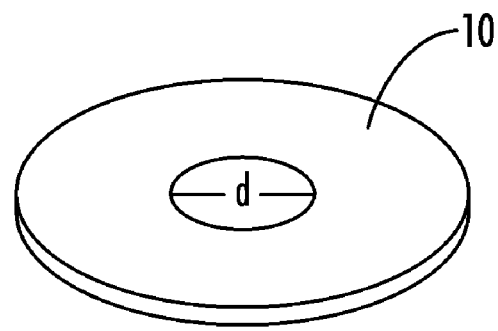
FIG. 1 is a side perspective view of an end-face seal for a graphite electrode in accordance with the present invention.
Figure 2:
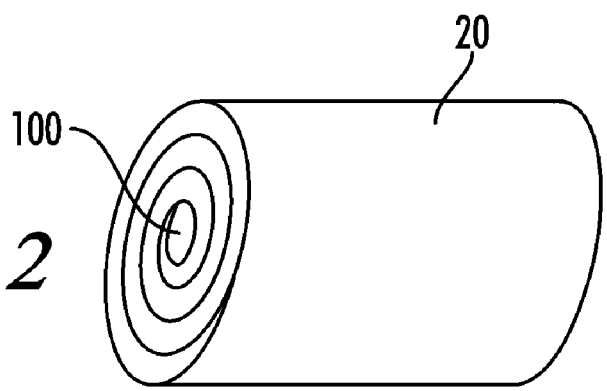
FIG. 2 is a side perspective view of a spiral wound flexible graphite structure from which the end-face seal of FIG. 1 is derived.

Graphite electrodes can be fabricated by first combining a particulate fraction comprising calcined coke, pitch and, optionally, mesophase pitch or PAN-based carbon fibers into a stock blend. More specifically, crushed, sized and milled calcined petroleum coke is mixed with a coal-tar pitch binder to form the blend. The particle size of the calcined coke is selected according to the end use of the article, and is within the skill in the art. Generally, in graphite electrodes for use in processing steel, particles up to about 25 millimeters (mm) in average diameter are employed in the blend. The particulate fraction preferable includes a small particle size filler comprising coke powder. Other additives that may be incorporated into the small particle size filler include iron oxides to inhibit puffing (caused by release of sulfur from its bond with carbon inside the coke particles), coke powder and oils or other lubricants to facilitate extrusion of the blend.

After the blend of particulate fraction, pitch binder, etc. is prepared, the body is formed (or shaped) by extrusion though a die or molded in conventional forming molds to form what is referred to as a green stock. The forming, whether through extrusion or molding, is conducted at a temperature close to the softening point of the pitch, usually about 100° C. or higher. The die or mold can form the article in substantially final form and size, although machining of the finished article is usually needed, at the very least to provide structure such as threads. The size of the green stock can vary; for electrodes the diameter can vary between about 220 mm and 700 mm.

After extrusion, the green stock is heat treated by baking at a temperature of between about 700° C. and about 1100° C., more preferably between about 800° C. and about 1000° C., to carbonize the pitch binder to solid pitch coke, to give the article permanency of form, high mechanical strength, good thermal conductivity, and comparatively low electrical resistance, and thus form a carbonized stock. The green stock is baked in the relative absence of air to avoid oxidation. Baking should be carried out at a rate of about 1° C. to about 5° C. rise per hour to the final temperature. After baking, the carbonized stock may be impregnated one or more times with coal tar or petroleum pitch, or other types of pitches or resins known in the industry, to deposit additional coke in any open pores of the stock. Each impregnation is then followed by an additional baking step.

After baking, the carbonized stock is then graphitized. Graphitization is by heat treatment at a final temperature of between about 2500° C. to about 3400° C. for a time sufficient to cause the carbon atoms in the coke and pitch coke binder to transform from a poorly ordered state into the crystalline structure of graphite. Advantageously, graphitization is performed by maintaining the carbonized stock at a temperature of at least about 2700° C., and more advantageously at a temperature of between about 2700° C. and about 3200° C. At these high temperatures, elements other than carbon are volatilized and escape as vapors. The time required for maintenance at the graphitization temperature using the process of the present invention is no more than about 18 hours, indeed, no more than about 12 hours. Preferably, graphitization is for about 1.5 to about 8 hours. Once graphitization is completed, the finished article can be cut to size and then machined or otherwise formed into its final configuration.

The inventive seal comprises a material that is disposed in an electrode joint comprising male-female electrodes having blocked threads, between the end-faces of the adjoining electrodes where a gap of from about 1 mm to about 25 mm is present, with machining tolerances providing for a gap which can vary by 1 or 2 mm, up to several mm. The seal preferably comprises a material sized so as to fill the gap between the adjoining electrodes. To that end, the seal should advantageously be between about 1 mm and about 25 mm in thickness, more advantageously, between about 3 mm and about 12 mm in thickness. In addition, the seal should extend radially from the perimeter of the electrode joint in towards the center of the joint, terminating between the perimeter and the male threaded tang. Most preferably, the radius of the seal should be approximately equal to that of the electrodes between which it is disposed. Thus, the inventive seal should have a radius of between about 11 cm and about 37 cm (when used with graphite electrodes having a circular cross-section), more preferably between about 20 cm and about 30 cm, with a central opening having a diameter approximately equal to or larger than the diameter of the male tang (at its largest point); more particularly, the diameter of the central opening of the seal should be between about 50% and about 85% of the diameter of the electrodes between which it is disposed. In the most preferred embodiment, the central opening of the seal should be approximately equal to the diameter of threaded male tang (at its largest point).

The material(s) from which the inventive seal is produced or the orientation or placement of the seal, should be such that the seal is compressible to compensate for differences and changes in the gap between adjoining electrodes, which can vary based on the method used to connect the adjoining electrodes, as well as due to the different mechanical and thermal stresses to which the joint is exposed while in use in the furnace. In addition, compressibility of the seal material can help ensure that air does not pass between the seal and the electrodes between which it is positioned.

The material from which the seal of the present invention is formed should function to slow the rate at which the threads of the electrode joint oxidize. To do so, it has to reduce (or physically block) the exposure of the threads to the hot air in the furnace. More preferably, the seal material should oxidize at a rate equal to or slower than that of the electrodes forming the joint. Most preferably, the seal material should oxidize at as slow a rate as possible, while meeting the compressibility requirements.

Suitable materials useful for forming the inventive seal include paper, cardboard, paste, braided rope, etc. One especially preferred material is compressed particles of expanded (or exfoliated) graphite, sometimes referred to as flexible graphite. Especially useful are sheets of compressed particles of exfoliated graphite.

The graphite useful in forming the seals of the present invention is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes.

Graphite starting materials for the sheets suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials for the sheets used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than twenty weight percent. More preferably, the graphite employed for the present invention will have a purity of at least about 94%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl fornate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2-12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1, 4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one-half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1200° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.8 grams per cubic centimeter (g/cc). Most preferably, the graphite sheet used as the end face seal of the present invention has a density of about 1.1 to about 1.6 g/cc.

The flexible graphite sheet material exhibits an appreciable degree of anisotropy due to the of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

The thusly-formed flexible graphite sheet, formed so as to have the required central opening can be used as is, or it can be formed into a laminate of several such flexible graphite sheets (without or without an interlayer adhesive) and used as the inventive seal in that manner. Most preferably, though, because of the anisotropic nature of sheets of compressed particles of expanded graphite, the orientation of the graphite sheet seal should be such that the "a" direction, that is the direction parallel to the major opposed surfaces of the sheet, is directionally arrayed between the end faces of the electrodes. In this way, the higher electrical conductivity of the material in the "a" direction will improve the conductivity across the joint, as opposed to the "c" direction.

One embodiment of the inventive seal is illustrated in FIG. 1 and designated by the reference character 10. Seal 10 comprises a spiral wound sheet of compressed particles of exfoliated graphite, and has its "a" direction through the thickness of seal 10, rather than along its surface. Seal 10 can be formed, for instance, by winding one or more graphite sheets around a bolster 100 having a diameter equal to the desired diameter of the central opening "d" of seal 10. The sheets are wound around bolster 100 until a radius equal to the desired radius of seal 10 is achieved, resulting in a spiral wound graphite cylinder 20, which can be sliced into individual seals 10 of the desired thickness (either through bolster 100 or after removal of bolster 100). In this way, the "a" direction of higher conductivity is arrayed through the thickness of seal 10. Optionally, an adhesive can be interposed between the windings of seal 10 in order to prevent the spiral-wound seal 10 from unwinding.

Figure 6:
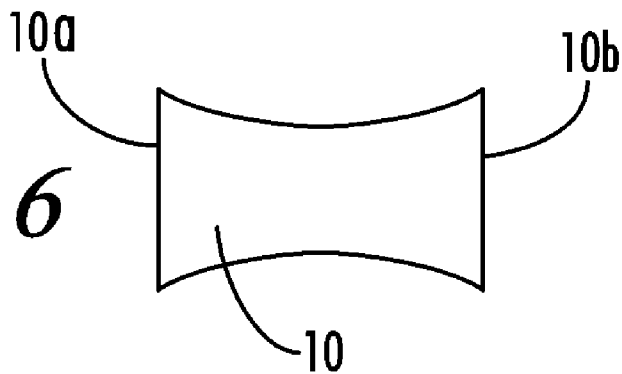
FIG. 6 is a side cross-sectional view of one embodiment of an end-face seal for graphite electrodes in accordance with the present invention.
Figure 7:
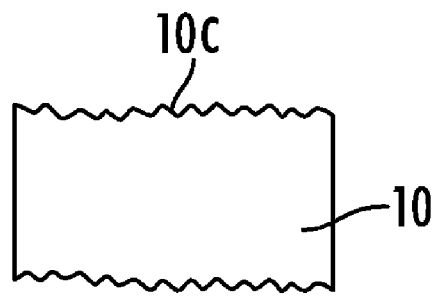
FIG. 7 is a side cross-sectional view of another embodiment of an end-face seal for graphite electrodes in accordance with the present invention.
Figure 8A:
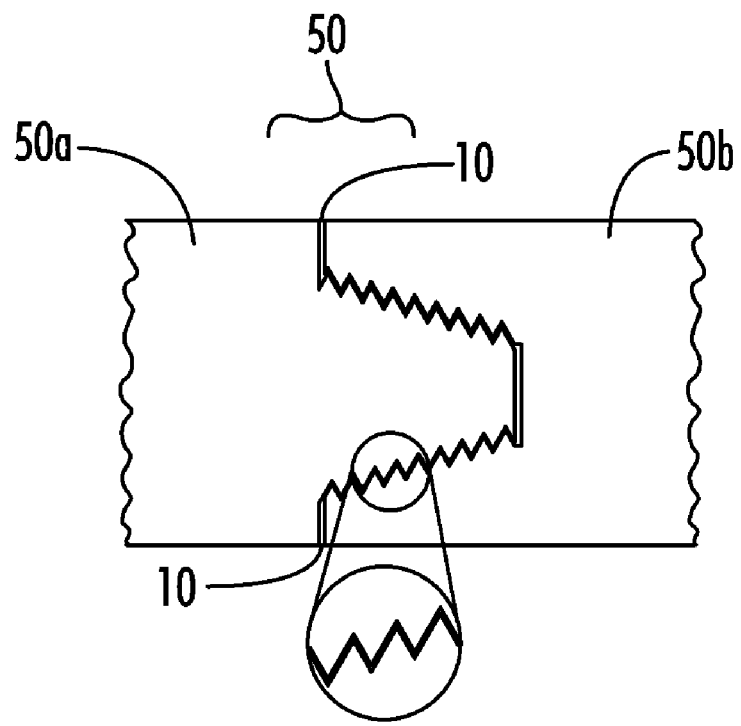
FIG. 8A is a side cross-sectional view of a male-female graphite electrode joint having blocked threads.
Figure 8B:
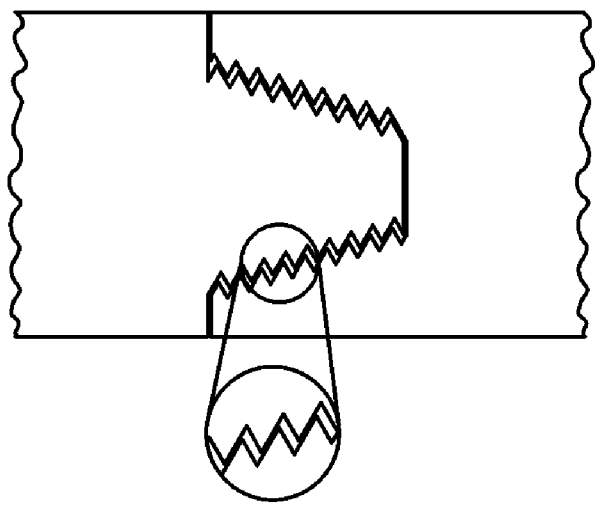
FIG. 8B is a side cross-sectional view of a male-female graphite electrode joint having non-blocked threads.

Alternatively, seal 10 can be formed by winding one or more flexible graphite sheets around a bolster 100 until a radius equal to the desired radius of seal 10 is achieved, and spiral wound cylinder 20 then compressed into the final desired thickness and shape. Indeed, as discussed above, the compression process can be used to mold (e.g., by die molding or the like) a concave or corrugated shape into seal 10, as illustrated in FIGS. 6 and 7, respectively, having arms 10a and 10b or ridges 10c which abut electrodes 30 and/or 40. These shapes can provide even greater compressibility to seal 10. Arms 10a and 10b, or ridges 10c, act to provide variability in the gap between the endfaces, which can vary by up to several millimeters due to machining tolerances. In other words, arms 10a and 10b, or ridges 10c, are compressible and can act to compensate for variability in the gap between the endfaces. If the gap between the endfaces is less than theoretical, formation of the joint will cause greater compression of arms 10a and 10b or ridges 10c; if the gap between the endfaces is greater than theoretical, formation of the joint will cause less compression of arms 10a and 10b or ridges 10c. The compressible nature of arms 10a and 10b or ridges 10c permits seal 10 to function in either case.

Figure 3:
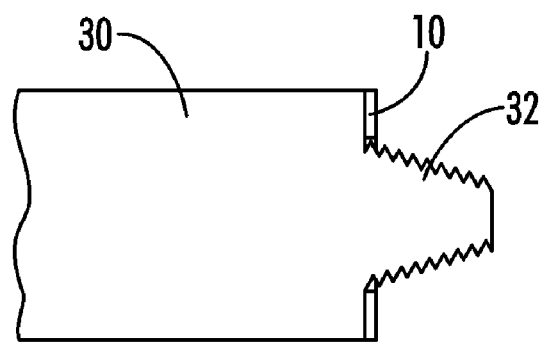
FIG. 3 is a partial side perspective view of a male threaded graphite electrode having an end-face seal in accordance with the present invention thereon.
Figure 4:
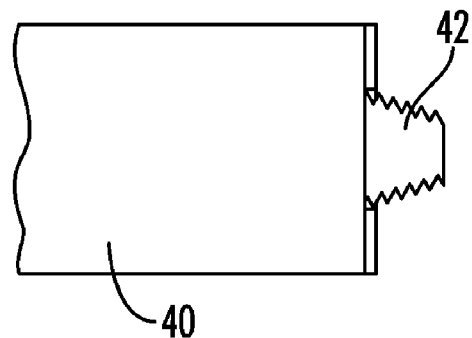
FIG. 4 is a partial side perspective view of a graphite electrode having a pin threaded thereinto and having an end-face seal in accordance with the present invention thereon.

Seal 10 is positioned between the end faces of adjoining graphite electrodes forming an electrode joint. For example, as illustrated in FIG. 3, a graphite electrode 30 having a machined male threaded stub 32 has seal 10 placed on end face 34 of electrode 30 about tang 32. When electrode 30 is then mated with an adjoining electrode having a machined female socket (not shown), therefore, seal 10 is positioned between the end faces of the adjoining electrodes.

Advantageously, seal 10 is positioned on electrode 30 during preparation of electrode 30, either at the forming plant or at the furnace site but prior to being brought into position above the furnace for loading onto the electrode column to reduce the operational steps of forming the joint (which often takes place in a relatively hazardous environment). Likewise, when pin 42 is pre-set into electrode 40, seal 10 can be positioned on electrode 40 at the same time. Moreover, when seal 10 is formed in a concave shape, as shown in FIG. 6, and the concave portioned filled with a paste or cement, etc., a release liner can be used to protect the paste or cement from dirt, dust, or other undesired substances which might otherwise adhere to it.

Figure 5:
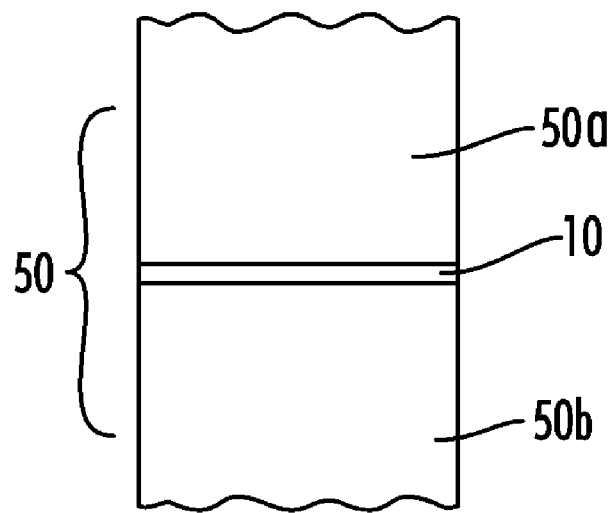
FIG. 5 is a side plan view of an electrode joint having an end-face seal in accordance with the present invention therein.

Accordingly, in use, electrode end-face seal 10 is positioned between the adjoining electrodes 50a and 50b in a male-female electrode joint 50, as illustrated in FIG. 5. Since seal 10 is compressible and advantageously oxidizes at a rate equal to or slower than that of electrodes 50a and 50b, it reduces oxygen ingress into joint 50 between the end faces of electrodes 50a and 50b and thereby reduces or eliminates oxidation of the threaded portions or pin 32 or male stub 42, and/or other surfaces of joint 50, extending the life and functionality of joint 50.

The disclosures of all cited patents and publications referred to in this application are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A male-female electrode joint comprising two joined graphite electrodes having blocked threads and having a seal interposed between the electrodes, wherein the seal has a concave cross-section and reduces the exposure of the threads of the joint to air.

2. The joint of claim 1 wherein the seal is compressible.

3. The joint of claim 2 wherein the seal comprises compressed particles of exfoliated graphite.

4. The joint of claim 3 wherein the electrical conductivity of the seal is greater in the direction extending between the electrodes than it is in the direction orthogonal thereto.

5. The joint of claim 4 wherein the seal comprises a spiral wound sheet of compressed particles of exfoliated graphite.

6. A male-female electrode joint comprising two joined graphite electrodes having blocked threads and having a seal interposed between the electrodes, wherein the seal has a corrugated cross-section and reduces the exposure of the threads of the joint to air.

7. The joint of claim 6 wherein the seal is compressible.

8. The joint of claim 7 wherein the seal comprises compressed particles of exfoliated graphite.

9. The joint of claim 8 wherein the electrical conductivity of the seal is greater in the direction extending between the electrodes than it is in the direction orthogonal thereto.

10. The joint of claim 9 wherein the seal comprises a spiral wound sheet of compressed particles of exfoliated graphite.

11. A male-female electrode joint comprising two joined graphite electrodes having blocked threads and having a compressible seal which comprises compressed particles of exfoliated graphite interposed between the electrodes, wherein the seal has a corrugated cross-section and reduces the exposure of the threads of the joint to air.

12. The joint of claim 11 wherein the electrical conductivity of the seal is greater in the direction extending between the electrodes than it is in the direction orthogonal thereto.

13. The joint of claim 12 wherein the seal comprises a spiral wound sheet of compressed particles of exfoliated graphite.

* * * * *